United States Patent [19]

Kieli

[11] Patent Number: 4,810,051
[45] Date of Patent: Mar. 7, 1989

[54] OPTICAL FIBER MODULATOR

[75] Inventor: Michael Kieli, Bensalem, Pa.

[73] Assignee: Thomas & Betts Corporation, Bridgewater, N.J.

[21] Appl. No.: 32,120

[22] Filed: Mar. 27, 1987

[51] Int. Cl.$^4$ ............................................. G02B 6/26
[52] U.S. Cl. ................................... 350/96.15; 250/227
[58] Field of Search ............... 350/96.10, 96.15, 96.29; 250/227

[56] References Cited

U.S. PATENT DOCUMENTS

| | | | |
|---|---|---|---|
| 4,295,738 | 10/1981 | Meltz et al. | 356/32 |
| 4,295,739 | 10/1981 | Meltz et al. | 356/43 |
| 4,300,816 | 11/1981 | Snitzer et al. | 350/96.33 |
| 4,342,907 | 8/1982 | Macedo et al. | 250/227 |
| 4,363,533 | 12/1982 | Stowe et al. | 350/96.33 |
| 4,427,881 | 1/1984 | Ruell | 250/227 |
| 4,436,368 | 3/1984 | Keck | 350/96.33 |
| 4,443,698 | 4/1984 | Schiffner | 250/227 |
| 4,443,700 | 4/1984 | Macedo et al. | 250/227 |
| 4,472,628 | 9/1984 | Whitten | 250/227 |
| 4,588,886 | 5/1986 | Snider | 250/227 |
| 4,611,378 | 9/1986 | Caserta et al. | 29/407 |
| 4,626,680 | 12/1986 | Martens et al. | 350/96.29 |
| 4,633,079 | 12/1986 | Rieger | 250/227 |
| 4,667,097 | 5/1987 | Fasching et al. | 350/96.29 |
| 4,676,594 | 6/1987 | Presby | 350/96.29 |
| 4,678,903 | 7/1987 | Wlodarczyk et al. | 250/227 |
| 4,682,895 | 7/1987 | Costello | 350/96.29 |

FOREIGN PATENT DOCUMENTS 0178806  4/1986  European Pat. Off. ......... 350/96.15

Primary Examiner—William L. Sikes
Assistant Examiner—Frank González
Attorney, Agent, or Firm—Robert M. Rodrick; Salvatore J. Abbruzzese

[57] ABSTRACT

A method of modulating light in a optical fiber is disclosed. Light is launched into a multimode fiber in a restricted group of fiber modes. Disturbances placed in the fiber modulates the light being sent therethrough. The modulated light is received by a detector and may be readily interpreted. This method is especially useful in locations where electronic components may not be used.

7 Claims, 1 Drawing Sheet

OPTICAL FIBER MODULATOR

FIELD OF THE INVENTION

The present invention relates generally to an optical modulating apparatus, and more particularly to a method of modulating light in an optical fiber.

BACKGROUND OF THE INVENTION

It has been long known that a carrier wave may be modulated by an information-bearing signal in order to transmit that signal along the carrier wave. Typically, in data transmission as well as voice transmission in telephone applications, the carrier signal is carried on copper wires in the form of electrical current. It is also known that improved results may be achieved by replacing the electrical components with optical components and modulating an optical signal along a waveguide or other optical components.

Prior art optical techniques for modulating signals may take the form of a mechanical shutter which is interposed between areas of light transmission. These shutters tend to be slow, and would not be efficient in transmitting data at high rates of speed. Another technique includes the use of an optical crystal across which electrical voltage may be applied. Light from a laser is injected into one side of the crystal and a light-receiving means such as a waveguide would receive the light passing through the crystal from the laser. Voltage applied across the crystal alters the optical characteristics of the crystal to change or modulate the light passing therethrough. This provides a workable optical modulation device. However, it can be seen that the components used to form such modulation device, namely a laser and an optical crystal, are quite expensive. Also the voltage which must be applied across the crystal must be in the range of 10 KV or greater. Thus, known optical modulating devices cannot be easily or inexpensively constructed. Therefore, it is desirable to provide an optical fiber modulations assembly which may be composed of relatively inexpensive components yet provide the desired modulating characteristics. The modulation assembly could be interposed between a pair of transmitting fibers to modulate the light therebetween.

SUMMARY OF THE INVENTION

It is an object of the present invention to provide an optical modulating assembly.

It is a further object of the present invention to provide a method for modulating light using an optical fiber.

In the efficient attainment in these and other objects, the present looks toward providing a method of modulating an optical signal carried along an optical fiber. A modulation assembly may be interposed in the fiber extent so that the carrier signal is transmitted from one end and the modulated signal is sent along the other end. The modulation assembly includes a multimode fiber where light is injected into the fiber in a restricted group of modes substantially less than the total number of modes supported by the multimode fiber. The fiber is disturbed or modulated at an intermediate portion thereof to change the modal distribution of the light within the multimode fiber. This disturbance may be measured at the other end of the fiber, thus the fiber would serve as a suitable modulating device.

In a specific example showed by way of preferred embodiment in the present invention, a preselected disturbance is placed in a fiber to modulate the signal being transmitted therethrough. The disturbance causes a change in the modal distribution of light within the fiber. This modulated signal is then detected by the detector at the other end of the fiber.

DETAILED DESCRIPTION OF THE PREFERRED EMBODIMENT

Figure 1:
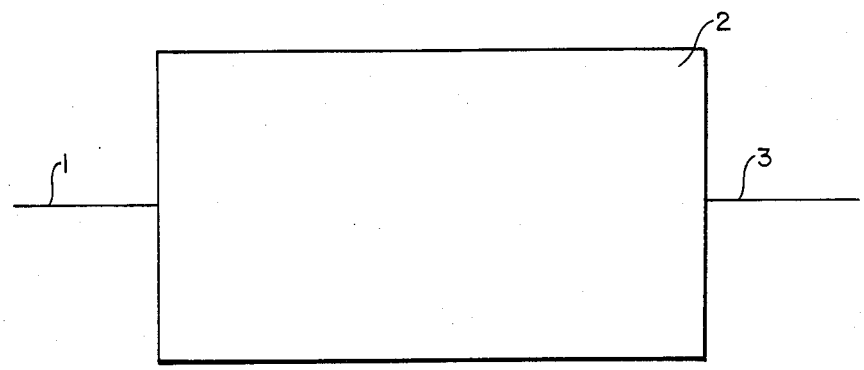
FIG. 1 shows, in schematic representation, a fiber optic system which may employ the modulation assembly of the present invention.

Referring to FIG. 1, it is desirable to modulate light in the form of a carrier signal generated from a source (not shown) and carried by an optical fiber 1. Light is typically modulated within a given enclosed location 2 so that the modulated signal may be transmitted by a fiber 3 to a receiver (not shown). The location 2 at which the light is modulated may be any desired location. However, the present invention is particularly useful where the location or environment in which the modulation is to occur is a hazardous environment where electronic components are not normally used. As shown in FIG. 1, the carrier wave is brought into the modulating location 2 by fiber 1 and a modulated signal is carried away from the modulating location 2 by fiber 3.

Figure 2:
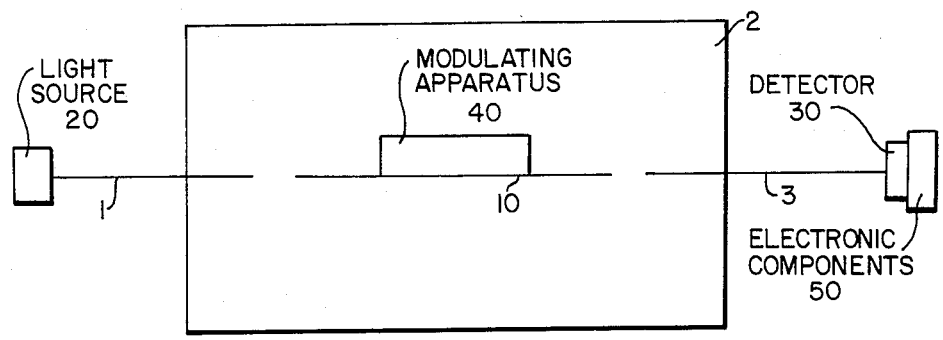
FIG. 2 is a more detailed showing of the invention of FIG. 1

Referring now to FIG. 2, an optical fiber modulation assembly used in location 2 is shown in schematic fashion. The main components of the modulating assembly of the present invention include an elongate multimode fiber 10 which receives the carrier signal. Fiber 10 is a conventional multimode fiber which includes an optical core surrounded by cladding as is well known in fiber optic technology. Light is transmitted through the core of a multimode fiber in light groups commonly referred to as modes. As described in detail hereinbelow, a multimode fiber is capable of supporting light for transmission in plural groups of core modes. The carrier signal may be generated from any known light source. In the present invention the light source 20 is shown exteriorly of location 2, being carried into location 2 by fiber 1.

Other components of the modulating assembly include a detector 30, which may be of conventional construction, such as a far field detector. Detector 30 detects light emanating from fiber 10. While the detector may be placed adjacent fiber 10, in the present illustrative embodiment, the detector is placed away from location 2 to detect light carried by fiber 3 from fiber 10. A modulating apparatus 40 is included which engages a central extent of fiber 10 and is responsive to physical contact to disturb the fiber 10. The modulation apparatus 40 is a conventionally known device. Disturbances in fiber 10 cause a redistribution of the modal characteristics of the light propagating therethrough such that it can be detected by detector 30. Electronic components 50 may also be used to interpret the modal characteristics of the light to determine the degree of disturbance. As with detector 30, electronic components 50 may be located externally of location 2.

A method and apparatus which employs the principal of modal distribution of light in a fiber to form a fiber optic sensor is shown and described and commonly assigned copending U.S. Patent application, Ser. No. 861,782, filed May 9, 1986, entitled "Method and Apparatus for Fiber Optic Sensing." The fiber optic sensor disclosed therein launches light into a restricted group of fiber modes substantially less than the total number of modes supported by the fiber. A sensor is responsive to changes in the external environment surrounding the fiber to place a disturbance in the fiber. This disturbance changes the modal distribution of light in the fiber. Light which was originally launched in certain modes is excited into other modes originally kept dark. This change in modal distribution may be measured at the other end of the fiber.

The present invention employs this principle by placing a predetermined disturbance in fiber 10 to alter the modal characteristics of launched light. In order that the apparatus may function adequately as a modulation device, light is injected into fiber 10 from fiber 1 in a restricted group of fiber modes substantially less than all the modes which may be supported by multimode fiber 10. Techniques for injecting light from fiber 1 into fiber 10 in only lowest order modes is shown and described in the above-mentioned U.S. patent application Ser. No. 866,857.

The modulation apparatus 40 may be used to place a disturbance in fiber 10 to change the modal distribution of light being transmitted therethrough. Light from fiber 1 may be sent through fiber 10 in lowest order modes. The modulator can interrupt and change the distribution of light in such a manner that it could be detected by detector 30. This change can be interpreted by electronic components 50 so that the modulated signal can be used.

Various changes to the foregoing described in shown structures would now be evident to those skilled in the art. Accordingly, the particularly disclosed scope of the invention is set forth in the following claims.

I claim:

1. A method of modulating an optical signal carried by a core of an elongate multimode optical fiber, said signal including light distributed in said fiber in a restricted group of core modes, substantially less than the total number of core modes supported by said fiber, said method comprising the steps of:
   disturbing said fiber at an intermediate portion thereof to change the modal distribution of said light within said fiber core; and
   detecting the modal distribution of said light in said restricted group of core modes.

2. A method in accordance with claim 1 wherein said light is distributed in said fiber by injecting said light into one end of said fiber.

3. A method in accordance with claim 2 wherein said detecting step further includes:
   detecting said light eminating from the other end of said fiber.

4. A method in accordance with claim 1 further including the steps of:
   disposing a modulator adjacent said intermediate portion of said fiber, said modulator being operable to cause said disturbance to said fiber.

5. A method of modulating an optical signal carried by a carrier fiber through an enclosure, said carrier fiber being an extent of a multimode optical fiber having a core including plural light carrying modes and a cladding therearound, the method comprising the steps of:
   disposing an extent of said carrier fiber inside said enclosure;
   disposing a light source outside said enclosure;
   disposing a light detector outside said enclosure;
   inducing light from said light source into said carrier fiber extent, said light being induced into said carrier fiber extent in a selected group of core modes substantially less than the total modes of said core;
   modulating said light in said selected group of core modes to change the modal distribution in said selected group of core modes;
   carrying said modulated light from said carrier fiber extent to said detector; and
   detecting said modulated light in said selected group of core modes.

6. A method in accordance with claim 5 wherein said selected group of modes includes only the lowest order modes supported by said fiber core.

7. A method in accordance with claim 5 wherein said modulating step includes:
   disposing a modulator within said enclosure in engagement with said fiber extent.

* * * * *

UNITED STATES PATENT AND TRADEMARK OFFICE
CERTIFICATE OF CORRECTION

PATENT NO.  :  4,810,051
DATED       :  March 7, 1989
INVENTOR(S) :  Michael Kieli It is certified that error appears in the above-identified patent and that said Letters Patent is hereby corrected as shown below:

Column 3, line 3 change "and" second occurrence to --in--.

Column 3, line 28 change "866,857" to --861,782--.

Signed and Sealed this

Twenty-second Day of August, 1989

Attest:

DONALD J. QUIGG

Attesting Officer

Commissioner of Patents and Trademarks